(12) United States Patent
Liao

(10) Patent No.: US 10,968,976 B2
(45) Date of Patent: Apr. 6, 2021

(54) DETACHABLE SERVER

(71) Applicant: Hexin Precision Technology (Wujiang) Co., Ltd., Suzhou (CN)

(72) Inventor: Chongyi Liao, Suzhou (CN)

(73) Assignee: Hexin Precision Technology (Wujiang) Co., Ltd.

( * ) Notice: Subject to any disclaimer, the term of this patent is extended or adjusted under 35 U.S.C. 154(b) by 71 days.

(21) Appl. No.: 16/403,610

(22) Filed: May 5, 2019

(65) Prior Publication Data
US 2020/0263757 A1 Aug. 20, 2020

(51) Int. Cl.
*F16F 15/02* (2006.01)
*F16M 11/22* (2006.01)

(52) U.S. Cl.
CPC .......... *F16F 15/022* (2013.01); *F16M 11/22* (2013.01); *F16M 2200/08* (2013.01)

(58) Field of Classification Search
CPC .... F16F 15/022; F16M 11/22; F16M 2200/08
See application file for complete search history.

(56) References Cited

U.S. PATENT DOCUMENTS

| | | | | |
|---|---|---|---|---|
| 5,816,559 A | * | 10/1998 | Fujimoto | E04H 9/021 248/636 |
| 5,996,960 A | * | 12/1999 | Krajec | F16F 15/022 248/638 |
| 6,161,811 A | * | 12/2000 | Suhara | F16F 15/022 248/568 |
| 6,530,563 B1 | * | 3/2003 | Miller | F16F 7/14 188/378 |
| 9,255,399 B2 | * | 2/2016 | Ruan | E04H 12/22 |
| 2003/0160369 A1 | * | 8/2003 | LaPlante | B60G 17/08 267/136 |
| 2004/0159995 A1 | * | 8/2004 | Pavuk | B60G 5/00 267/248 |
| 2011/0017561 A1 | * | 1/2011 | Tanaka | F16F 7/14 188/378 |
| 2011/0049775 A1 | * | 3/2011 | Crumley | F16F 15/04 267/136 |
| 2012/0175489 A1 | * | 7/2012 | Taylor | F16F 15/067 248/563 |
| 2014/0060296 A1 | * | 3/2014 | Monteil | F41F 3/042 89/1.801 |
| 2019/0257382 A1 | * | 8/2019 | Arias-Acosta | F16F 15/0235 |
| 2020/0056676 A1 | * | 2/2020 | Martin Hern Ndez | F16F 15/022 |
| 2020/0191328 A1 | * | 6/2020 | Rawas | G01D 11/10 |
| 2020/0217386 A1 | * | 7/2020 | Kordunsky | F16F 7/104 |

* cited by examiner

*Primary Examiner* — Eret C McNichols

(57) ABSTRACT

A detachable server comprising an upper cover, sidewall plates, a base and vibration-absorbing assemblies; the base comprises a bottom plate, transverse plates a, vertical plates a and vertical plates b; two vertical plates a are symmetrically and vertically arranged on the edges of the two ends of the top of the bottom plate; the edge of the top of the inner side surface of the vertical plate a is vertically connected with the transverse plate a, and the edge of the other end of the bottom of the transverse plate a is vertically connected with the vertical plate b; a plurality of threaded holes c are equidistantly formed in the outer side surface of the vertical plate a; two sidewall plates are symmetrically arranged at the two ends of the top of the base; the sidewall plate comprises a transverse plate b.

4 Claims, 5 Drawing Sheets

DETACHABLE SERVER

TECHNICAL FIELD OF THE INVENTION

The present invention relates to the technical field of detachable server appliance, and more particularly, to a detachable server.

BACKGROUND OF THE INVENTION

In the prior art, traditional servers normally possess a one-piece structure, are difficult to disassemble, assemble or transport them. In addition to shortcomings such as low strength and poor vibration absorption, the one-piece structure also deforms easily. As a result, it's urgent for those skilled in this field to develop a novel detachable server.

SUMMARY OF THE INVENTION

The purpose of the present invention is to solve the shortcomings in the prior art by providing a detachable server, which can be conveniently disassembled and assembled, such that it is easy to transport, The sidewall plate and the base are two types of sheet metal parts interacting with each other, greatly enhancing the structural strength while preventing the deformation. As the vibration absorption can be facilitated, an ideal vibration-absorbing effect can be achieved.

To achieve the above purpose, the present invention adopts the following technical solution:

A detachable server comprising an upper cover, sidewall plates, a base and vibration-absorbing assemblies; the base comprises a bottom plate, transverse plates a, vertical plates a and vertical plates b; two vertical plates a are symmetrically and vertically arranged on the edges of the two ends of the top of the bottom plate; the edge of the top of the inner side surface of the vertical plate a is vertically connected with the transverse plate a, and the edge of the other end of the bottom of the transverse plate a is vertically connected with the vertical plate b; a plurality of threaded holes c are equidistantly formed in the outer side surface of the vertical plate a, and two sidewall plates are symmetrically arranged at the two ends of the top of the base; the sidewall plate comprises a transverse plate b, a transverse plate c, a vertical plate c and a vertical plate d; the two edges of the top of the transverse plate b are respectively vertically provided with a vertical plate c and a vertical plate d, and the transverse plate c is vertically installed on the edge of the top of the inner side face of the vertical plate c; a plurality of threaded holes b are equidistantly formed in the outer side surface of the vertical plate c, and a plurality of slots are equidistantly formed in the top of the vertical plate d; the transverse plate c is parallelly arranged below the bottom of the transverse plate a, and the transverse plate b is parallelly arranged above the top of the bottom plate; the vertical plate c is parallelly arranged on the inner side surface of the vertical plate a, and the vertical plate d is parallelly arranged on the outer side surface of the vertical plate b; the plurality of threaded holes b correspond to the plurality of threaded holes c in a one-to-one mode, and the base is in threaded connection with the threaded hole b through a plurality of bolts a that penetrate through the plurality of threaded holes c in a one-to-one mode; a plurality of threaded holes a are symmetrically formed in the two sides of the upper cover, and the two sides of the upper cover are correspondingly attached to the inner sides of the two vertical plates d; the plurality of threaded holes a correspond to the plurality of slots in a one-to-one mode, and the vertical plate d is in threaded connection with the threaded holes a through a plurality of bolts b that penetrate through the plurality of slots in a one-to-one mode; two vibration-absorbing assemblies are symmetrically installed at the two ends between the upper cover and the base.

In another aspect of the present invention, the vibration-absorbing assembly comprises a lower fixing seat, a lower reset spring, a vibrator, a lower nut, an upper fixing seat, an upper nut, an upper threaded rod, an upper reset spring and a lower threaded rod. The upper fixing seat is arranged at the bottom of the upper cover, and the upper threaded rod is vertically arranged at the bottom of the upper fixing seat. The upper threaded rod is in threaded connection with the upper nut. The lower fixing seat is arranged at the position where the top of the bottom plate corresponds to the upper fixing seat, and the lower threaded rod is vertically installed at the top of the lower fixing seat. The lower threaded rod is in threaded connection with the lower nut, and the two ends of the vibrator are respectively fixedly soldered with the lower reset spring and the upper reset spring. The upper reset spring is connected to the outer side of the upper threaded rod in a sleeved mode, and the top end of the upper reset spring abuts against the bottom of the upper nut. The lower reset spring is connected to the outer side of the lower threaded rod in a sleeved mode, and the bottom end of the lower reset spring abuts against the top of the lower nut.

In another aspect of the present invention, the number of the threaded holes b is the same as that of the threaded holes c, and the distance between every two adjacent holes b is equal to the distance between every two adjacent threaded holes c.

In another aspect of the present invention, the lower fixing seat and the upper fixing seat are respectively fixedly connected with the top of the bottom plate and the bottom of the upper cover through welding.

Compared with the prior art, the present invention has the following advantages:

First, the base is in threaded connection with the threaded hole b through a plurality of bolts a that penetrate through the plurality of threaded holes c in a one-to-one mode, and the vertical plate d is in threaded connection with the threaded holes a through a plurality of bolts b that penetrate through the plurality of slots in a one-to-one mode. By means of this design, convenient disassembly and assembly of the present invention can be achieved, and the space occupation during transportation can be significantly reduced. Moreover, the sidewall plate and the base are two types of sheet metal parts interacting with each other, greatly enhancing the structural strength while preventing the deformation from occurring.

Second, when the structure vibrates, the vibrator absorbs the vibrational energy and vibrates, thereby simultaneously propelling the lower reset spring and the upper rest spring that are located at the two ends of the vibrator to vibrate. Due to the elastic action of the lower reset spring and the upper reset spring, an ideal vibration-absorbing effect can be achieved. Meanwhile, through regulating the positions of the lower nut and the upper nut that are respectively arranged on the lower threaded rod and the upper threaded rod, the elasticity of the lower reset spring and the upper reset spring can be regulated, greatly improving the use effect of the present invention.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1—Upper Cover, 11—Threaded Hole a, 2—Sidewall Plate, 21—Threaded Hole b, 22—Slot, 3—Base, 31—Threaded Hole c, 4—Vibration-absorbing Assembly, 41—Lower Fixing Seat, 42—Lower Reset Spring, 43—Vibrator, 44—Lower Nut, 45—Upper Fixing Seat, 46—Upper Nut, 47—Upper Threaded Rod, 48—Upper Reset Spring, 49—Lower Threaded Rod.

DETAILED DESCRIPTION OF THE INVENTION

Drawings and detailed embodiments are combined hereinafter to elaborate the technical principles of the present invention.

Figure 1:
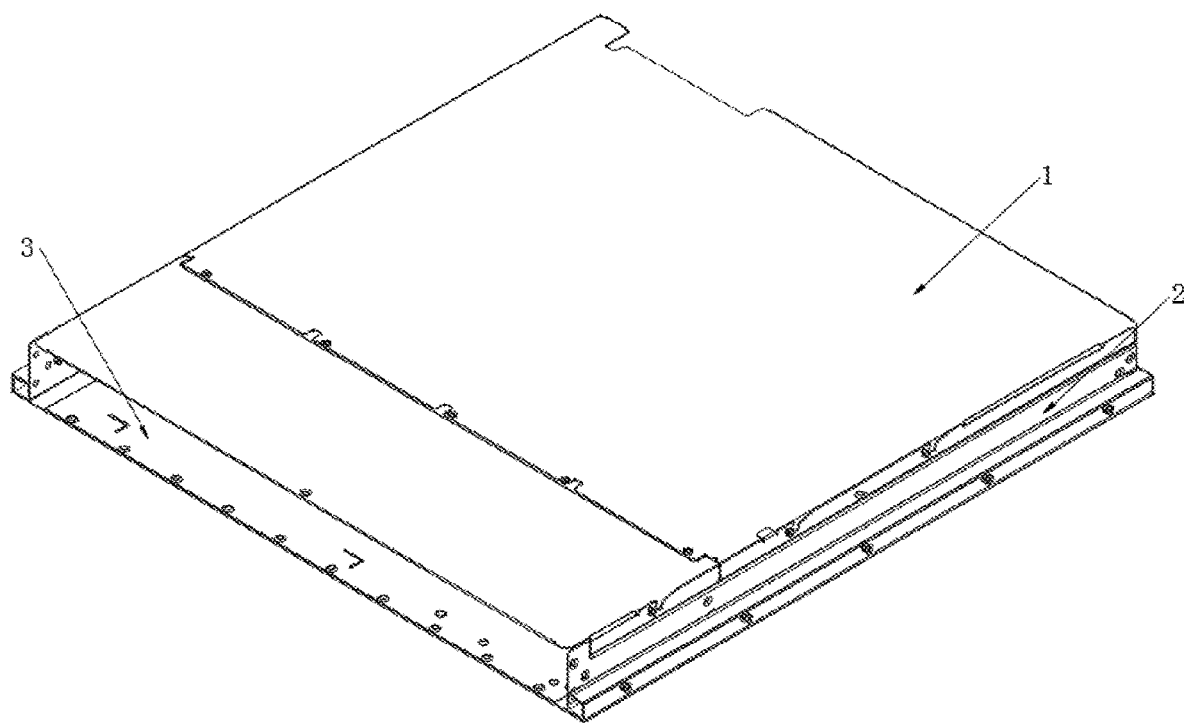
FIG. 1 is a schematic diagram illustrating an overall structure of the present invention.
Figure 2:
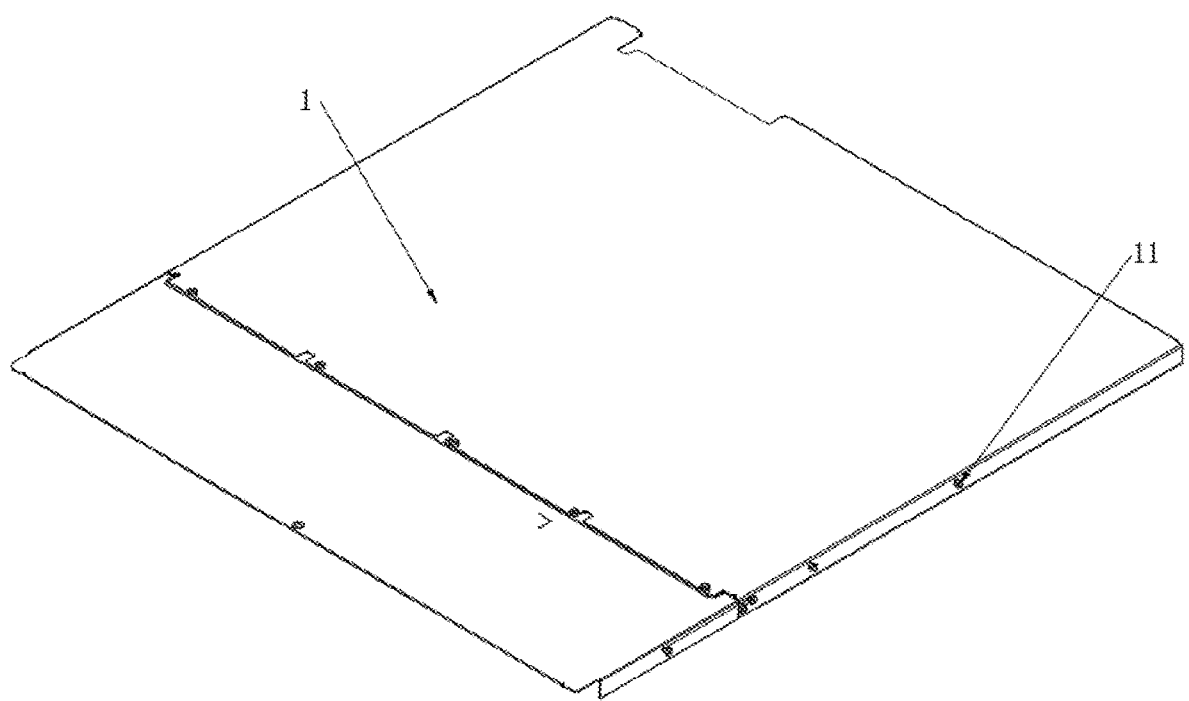
FIG. 2 is a structural diagram of the upper over of the present invention.
Figure 3:
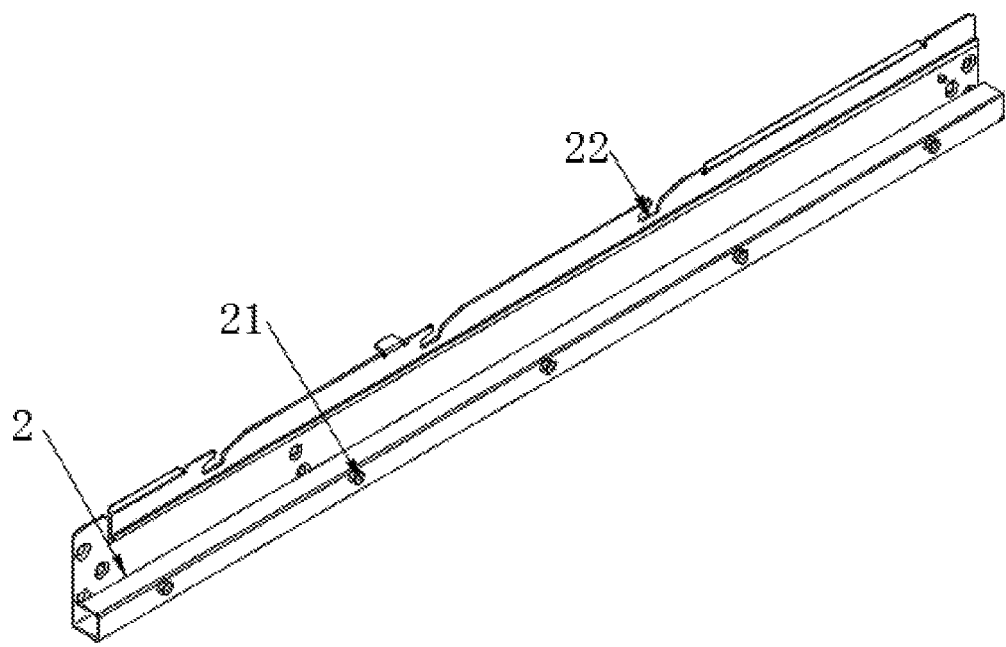
FIG. 3 is a structural diagram of the sidewall plate of the present invention.
Figure 4:
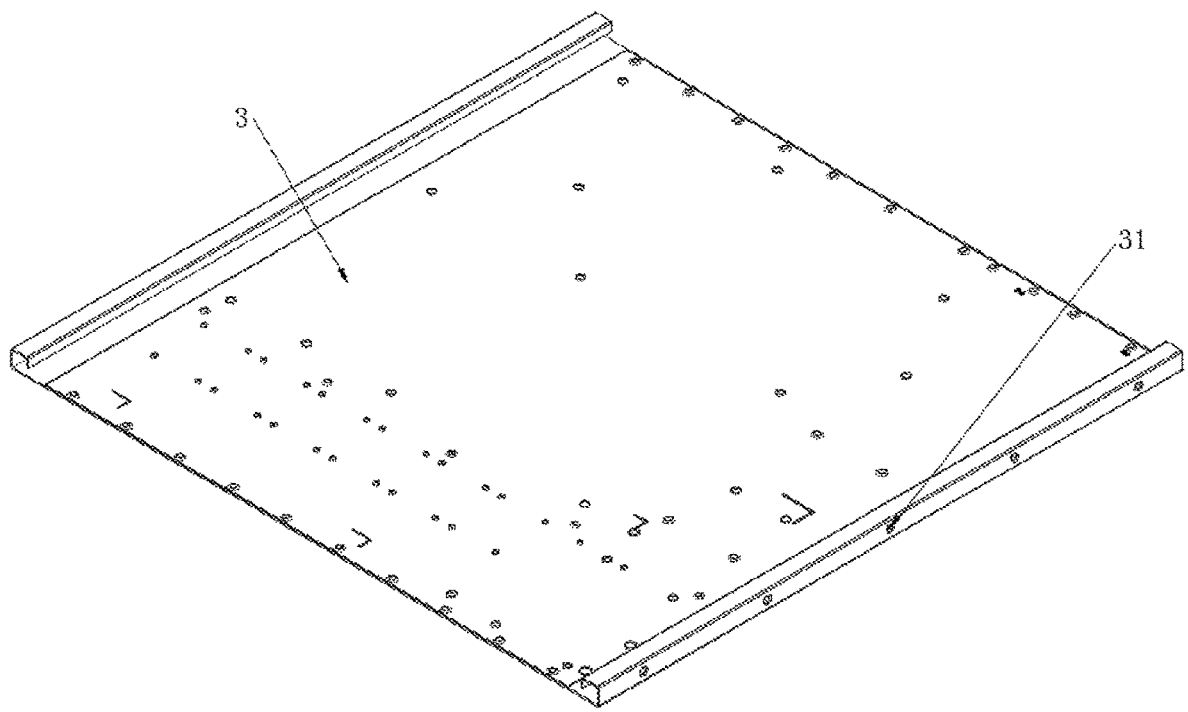
FIG. 4 is a structural diagram of the base of the present invention.
Figure 5:
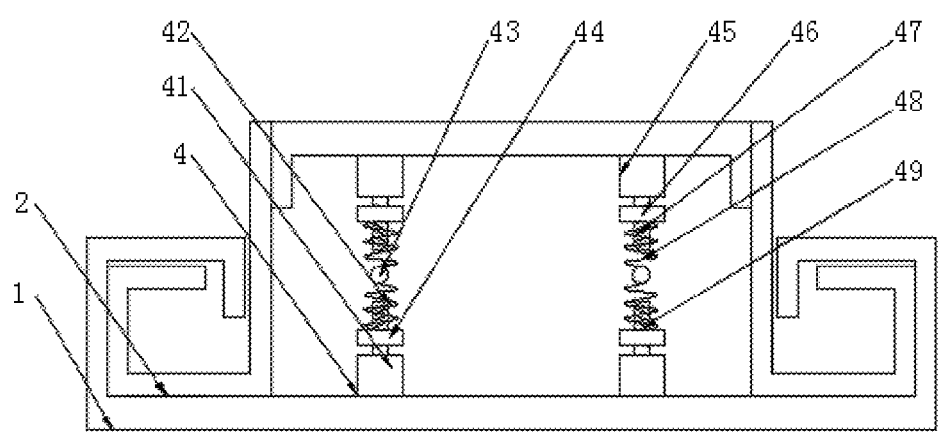
FIG. 5 is a front view of the present invention.

As shown in FIGS. 1-5, the detachable server comprises an upper cover 1, sidewall plates 2, a base 3 and vibration-absorbing assemblies 4. The base 3 comprises a bottom plate, transverse plates a, vertical plates a and vertical plates b. Two vertical plates a are symmetrically and vertically arranged on the edges of the two ends of the top of the bottom plate. The edge of the top of the inner side surface of the vertical plate a is vertically connected with the transverse plate a, and the edge of the other end of the bottom of the transverse plate a is vertically connected with the vertical plate b. A plurality of threaded holes c31 are equidistantly formed in the outer side surface of the vertical plate a, and two sidewall plates 2 are symmetrically arranged at the two ends of the top of the base 3. The sidewall plate 2 comprises a transverse plate b, a transverse plate c, a vertical plate c and a vertical plate d. The two edges of the top of the transverse plate b are respectively vertically provided with a vertical plate c and a vertical plate d, and the transverse plate c is vertically installed on the edge of the top of the inner side face of the vertical plate c. A plurality of threaded holes b21 are equidistantly formed in the outer side surface of the vertical plate c, and a plurality of slots 22 are equidistantly formed in the top of the vertical plate d. The transverse plate c is parallelly arranged below the bottom of the transverse plate a, and the transverse plate b is parallelly arranged above the top of the bottom plate. The vertical plate c is parallelly arranged on the inner side surface of the vertical plate a, and the vertical plate d is parallelly arranged on the outer side surface of the vertical plate b. The plurality of threaded holes b21 correspond to the plurality of threaded holes c31 in a one-to-one mode, and the base 3 is in threaded connection with the threaded hole b21 through a plurality of bolts a that penetrate through the plurality of threaded holes c31 in a one-to-one mode. A plurality of threaded holes all are symmetrically formed in the two sides of the upper cover 1, and the two sides of the upper cover 1 are correspondingly attached to the inner sides of the two vertical plates d. The plurality of threaded holes all correspond to the plurality of slots 22 in a one-to-one mode, and the vertical plate d is in threaded connection with the threaded holes all through a plurality of bolts b that penetrate through the plurality of slots 22 in a one-to-one mode. Two vibration-absorbing assemblies 4 are symmetrically installed at the two ends between the upper cover 1 and the base 3. According to the above, the present invention can be conveniently disassembled or assembled, greatly reducing the space occupation during transportation. The sidewall plate 2 and the base 3 are two types of sheet metal parts interacting with each other, achieving the increase of structural strength and the prevention of deformation.

The number of the threaded holes b21 is the same as that of the threaded holes c31, and the distance between every two adjacent threaded holes b21 is equal to the distance between every two adjacent threaded holes c31. By means of this design, a better interaction among parts is realized.

Furthermore, the vibration-absorbing assembly 4 comprises a lower fixing seat 41, a lower reset spring 42, a vibrator 43, a lower nut 44, an upper fixing seat 45, an upper nut 46, an upper threaded rod 47, an upper reset spring 48 and a lower threaded rod 49. The upper fixing seat 45 is arranged at the bottom of the upper cover 1, and the upper threaded rod 47 is vertically arranged at the bottom of the upper fixing seat 45. The upper threaded rod 47 is in threaded connection with the upper nut 46. The lower fixing seat 41 is arranged at the position where the top of the bottom plate corresponds to the upper fixing seat 45, and the lower threaded rod 49 is vertically installed at the top of the lower fixing seat 41. The lower threaded rod 49 is in threaded connection with the lower nut 44, and the two ends of the vibrator 43 are respectively fixedly soldered with the lower reset spring 42 and the upper reset spring 48. The upper reset spring 48 is connected to the outer side of the upper threaded rod 47 in a sleeved mode, and the top end of the upper reset spring 48 abuts against the bottom of the upper nut 46. The lower reset spring 42 is connected to the outer side of the lower threaded rod 49 in a sleeved mode, and the bottom end of the lower reset spring 42 abuts against the top of the lower nut 44. In this way, the absorption of vibrational energy can be facilitated, and the amplitude of vibration can be reduced, achieving an ideal vibration-absorbing effect.

The lower fixing seat 41 and the upper fixing seat 45 are respectively fixedly connected with the top of the bottom plate and the bottom of the upper cover 1 through welding. Thus, a firm structure of the present invention can be achieved.

The operating principle of the present invention is the following:

The base 3 is in threaded connection with the threaded hole b21 through a plurality of bolts a that penetrate through the plurality of threaded holes c31 in a one-to-one mode, and the vertical plate d is in threaded connection with the threaded holes all through a plurality of bolts b that penetrate through the plurality of slots 22 in a one-to-one mode. By means of this design, convenient disassembly and assembly of the present invention can be achieved, and the space occupation during transportation can be significantly reduced. Moreover, the sidewall plate 2 and the base 3 are two types of sheet metal parts interacting with each other, greatly enhancing the structural strength while preventing the deformation from occurring. When the structure vibrates, the vibrator 43 absorbs the vibrational energy and vibrates, thereby simultaneously propelling the lower reset spring 42 and the upper rest spring 48 that are located at the two ends of the vibrator 42 to vibrate. Due to the elastic action of the lower reset spring 42 and the upper reset spring 48, an ideal vibration-absorbing effect can be achieved. Meanwhile, through regulating the positions of the lower nut 44 and the upper nut 46 that are respectively arranged on the lower threaded rod 49 and the upper threaded rod 47, the elasticity of the lower reset spring 42 and the upper reset spring 48 can be regulated, greatly improving the use effect of the present invention.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A detachable server, comprising:
an upper cover,
sidewall plates,
a base, and
vibration-absorbing assemblies, wherein the base comprises a bottom plate, first transverse plates, first vertical plates and second vertical plates, wherein two first vertical plates are symmetrically and vertically arranged on edges of two ends of top of the bottom plate, wherein an edge of top of the inner side surface of the first vertical plate is vertically connected with the first transverse plate, and an edge of other end of bottom of the first transverse plate is vertically connected with the second vertical plate, wherein a plurality of third threaded holes are equidistantly formed in outer side surface of the first vertical plate, and two sidewall plates are symmetrically arranged at two ends of top of the base, wherein each sidewall plate comprises a second transverse plate, a third transverse plate, a third vertical plate and a fourth vertical plate, wherein two edges of top of each second transverse plate are respectively vertically provided with a third vertical plate and a fourth vertical plate, and the third transverse plate is vertically installed on an edge of top of inner side face of the third vertical plate, wherein a plurality of second threaded holes are equidistantly formed in outer side surface of the third vertical plate, and a plurality of slots are equidistantly formed in top of the fourth vertical plate, wherein the third transverse plate is parallelly arranged below bottom of the first transverse plate, and the second transverse plate is parallelly arranged above the top of the bottom plate, wherein the third vertical plate is parallelly arranged on inner side surface of the first vertical plate, and the fourth vertical plate is parallelly arranged on outer side surface of the second vertical plate, wherein the plurality of second threaded holes correspond to the plurality of third threaded holes in a one-to-one mode, and the base is in threaded connection with the second threaded hole through a plurality of first bolts that penetrate through the plurality of third threaded holes in a one-to-one mode, wherein a plurality of first threaded holes are symmetrically formed in two sides of the upper cover, and the two sides of the upper cover are correspondingly attached to the inner sides of the two fourth vertical plates, wherein the plurality of first threaded holes correspond to the plurality of slots in a one-to-one mode, and the fourth vertical plate is in threaded connection with the first threaded holes through a plurality of second bolts that penetrate through the plurality of slots in a one-to-one mode, and wherein two vibration-absorbing assemblies are symmetrically installed at two ends between the upper cover and the base.

2. The detachable server of claim 1, wherein the vibration-absorbing assembly comprises a lower fixing seat, a lower reset spring, a vibrator, a lower nut, an upper fixing seat, an upper nut, an upper threaded rod, an upper reset spring and a lower threaded rod, wherein the upper fixing seat is arranged at bottom of the upper cover, and the upper threaded rod is vertically arranged at bottom of the upper fixing seat, wherein the upper threaded rod is in threaded connection with the upper nut, wherein the lower fixing seat is arranged at a position where the top of the bottom plate corresponds to the upper fixing seat, and the lower threaded rod is vertically installed at top of the lower fixing seat, wherein the lower threaded rod is in threaded connection with the lower nut, and two ends of the vibrator are respectively fixedly soldered with the lower reset spring and the upper reset spring, wherein the upper reset spring is connected to outer side of the upper threaded rod in a sleeved mode, and top end of the upper reset spring abuts against bottom of the upper nut, and wherein the lower reset spring is connected to outer side of the lower threaded rod in a sleeved mode, and bottom end of the lower reset spring abuts against top of the lower nut.

3. The detachable server of claim 2, wherein the lower fixing seat and the upper fixing seat are respectively fixedly connected with the top of the bottom plate and bottom of the upper cover through welding.

4. The detachable server of claim 1, wherein number of the second threaded holes is the same as number of the third threaded holes, and distance between every two adjacent second threaded holes is equal to distance between every two adjacent third threaded holes.

* * * * *